US011446753B2

(12) United States Patent
Ono et al.

(10) Patent No.: US 11,446,753 B2
(45) Date of Patent: Sep. 20, 2022

(54) ARC WELDING CONTROL METHOD

(71) Applicant: DAIHEN CORPORATION, Osaka (JP)

(72) Inventors: Kohei Ono, Osaka (JP); Toshiaki Nakamata, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 433 days.

(21) Appl. No.: 16/322,321

(22) PCT Filed: Jul. 6, 2017

(86) PCT No.: PCT/JP2017/024849
§ 371 (c)(1),
(2) Date: Jan. 31, 2019

(87) PCT Pub. No.: WO2018/025572
PCT Pub. Date: Feb. 8, 2018

(65) Prior Publication Data
US 2020/0047273 A1    Feb. 13, 2020

(30) Foreign Application Priority Data

Aug. 2, 2016 (JP) .............................. JP2016-152028

(51) Int. Cl.
  *B23K 9/095*  (2006.01)
  *B23K 9/073*  (2006.01)
  *B23K 9/12*   (2006.01)

(52) U.S. Cl.
  CPC ............ *B23K 9/0953* (2013.01); *B23K 9/073* (2013.01); *B23K 9/124* (2013.01)

(58) Field of Classification Search
  CPC .... B23K 9/0953; B23K 9/073; B23K 9/1043; B23K 9/091; B23K 9/092; B23K 9/093;
  (Continued)

(56) References Cited

U.S. PATENT DOCUMENTS

| | | | | |
|---|---|---|---|---|
| 2012/0111842 A1* | 5/2012 | Fujiwara | ................... | B23K 9/09 219/130.33 |
| 2012/0255940 A1* | 10/2012 | Fujiwara | .............. | B23K 9/1012 219/136 |
| 2013/0299476 A1* | 11/2013 | Fujiwara | ................ | B23K 9/124 219/130.51 |

FOREIGN PATENT DOCUMENTS

| | | | |
|---|---|---|---|
| JP | 2012-006020 | | 1/2012 |
| JP | 20126020 | * | 1/2012 |

(Continued)

OTHER PUBLICATIONS

English translation to JP 2013233563 (Year: 2013).*
(Continued)

*Primary Examiner* — Tu B Hoang
*Assistant Examiner* — Bonita Khlok
(74) *Attorney, Agent, or Firm* — Greenblum & Bernstein, P.L.C.

(57) ABSTRACT

The purpose of the present invention is to reduce the amount of sputtering in a welding method wherein a welding wire feed rate is alternately switched between a forward feed period and a reverse feed period. Provided is an arc welding control method that switches a feed rate Fw for welding wire alternately between a forward feed period and a reverse feed period, repeats a short period and an arc period, and electrifies with a welding current Iw switched to a small current value in the latter half of the arc period, wherein a basic voltage setting value is set according to an average feed rate setting value, the error amplitude value for a voltage setting value and the basic voltage setting value is calculated, and the timing (current reduction time Td) for switching the welding current Iw to the small current value is varied on the basis of the average feed rate setting value and the error amplitude value.

2 Claims, 3 Drawing Sheets

(58) Field of Classification Search
CPC ............ B23K 9/0732; B23K 9/09–093; B23K 9/095–0956; B23K 9/124–125; B23K 9/067; B23K 9/1006; B23K 9/12
USPC ........ 219/137 PS, 130.51, 137 R, 125.1, 136
See application file for complete search history.

(56) References Cited

FOREIGN PATENT DOCUMENTS

| JP | 5201266 | | 6/2013 | | |
|----|---------|---|--------|---|---|
| JP | 2013233563 | * | 11/2013 | ............ | B23K 9/073 |
| WO | 2012/046411 | | 4/2012 | | |
| WO | 2013/008394 | | 1/2013 | | |

OTHER PUBLICATIONS

English translation to JP 2012-6020 (Year: 2012).*
Official Communication issued in Japan Patent Application No. PCT/JP2017/024849, dated Aug. 8, 2017, along with an English translation thereof.
Official Communication issued in International Bureau of WIPO Patent Application No. PCT/JP2017/024849, dated Jul. 25, 2017.

* cited by examiner

ARC WELDING CONTROL METHOD

TECHNICAL FIELD

The disclosure relates to an arc welding control method of performing welding by alternately switching a feeding rate of a welding wire between a forward-feeding period and a reverse-feeding period and repeating a short-circuit period and an arc period.

BACKGROUND ART

In a typical consumable electrode type arc welding, welding is performed by feeding a welding wire as a consumable electrode at a constant rate and generating an arc between the welding wire and a base metal. In the consumable electrode type arc welding, both the welding wire and the base metal are often placed in a welding state in which a short-circuit period and an arc period are alternately repeated.

In order to further improve welding quality, a forward and reverse feeding control method of performing welding by periodically repeating forward feeding and reverse feeding of a welding wire has been proposed. In the invention disclosed in Patent Document 1, an average value of a feeding rate is set to correspond to a current setting value, and a frequency and an amplitude in forward feeding and reverse feeding of a welding wire are set to values corresponding to the current setting value. In the welding method in which the forward feeding and the reverse feeding of the welding wire are repeated, a repetition cycle of a short circuit and an arc can be stabilized, as compared to the related art in which the welding wire is fed at a constant feeding rate. Therefore, it is possible to improve the welding quality such as reduction in a spatter generation amount and improvement in bead appearance.

In the consumable electrode type arc welding, spatters are generated when a short circuit occurs and when a short circuit state is released and an arc reoccurs. The spatters generated at the time of the reoccurrence of the arc can be drastically reduced by performing a forward and reverse feeding control and a constriction detection control. On the other hand, the spatters generated at the time of the occurrence of the short circuit can be reduced by setting the welding current at the time of the occurrence of the short circuit to a small current value. Therefore, the welding current is switched to a small current value immediately before a short circuit occurs. However, since it is difficult to predict the occurrence of a short circuit, the welding current is switched to a small current value after a predetermined time has elapsed from the reoccurrence of the arc (see Patent Document 2). When the switching timing to the small current value is too early, the arc state becomes unstable. Conversely, when the switching timing to the small current value is too late, the value of the welding current at the time of the occurrence of the short circuit cannot be reduced and spatters will occur. That is, it is necessary to optimize the timing of switching the welding current to the small current value according to the welding conditions.

CITATION LIST

Patent Document

Patent Document 1: JP-B-5201266
Patent Document 2: JP-A-2012-6020

SUMMARY OF INVENTION

Problems to be Solved by Invention

Therefore, the disclosure aims to provide an arc welding control method capable of reducing the generation of spatters by optimizing the timing of switching the welding current to a small current value in the latter half of an arc period in a welding method in which a feeding rate of a welding wire is alternately switched between a forward-feeding period and a reverse-feeding period.

Means for Solving the Problems

In order to solve the above problem, an arc welding control method of the disclosure includes alternately switching a feeding rate of a welding wire between a forward-feeding period and a reverse-feeding period; repeating a short-circuit period and an arc period; switching a welding current to a small current value in the latter half of the arc period to energize; setting an average value of the feeding rate according to an average feeding rate setting value; setting a welding voltage during the arc period according to a voltage setting value; and changing a timing at which the welding current is switched to the small current value based on the average feeding rate setting value.

Further, the arc welding control method of the disclosure includes changing the timing at which the welding current is switched to the small current value based on the voltage setting value.

Further, the arc welding control method of the disclosure includes setting a reference voltage setting value according to the average feeding rate setting value; and changing the timing at which the welding current is switched to the small current value based on an error amplification value between the voltage setting value and the reference voltage setting value.

The arc welding control method of the disclosure includes changing an amplification factor at the time of calculating the error amplification value according to the average feeding rate setting value.

Effects of Invention

According to the disclosure, it is possible to reduce the generation of spatters by optimizing the timing of switching the welding current to a small current value in the latter half of the arc period in the welding method in which the feeding rate of the welding wire is alternately switched between the forward-feeding period and the reverse-feeding period.

EMBODIMENT FOR CARRYING OUT INVENTION

Hereinafter, embodiments of the disclosure will be described with reference to the drawings.

First Embodiment

Figure 1:
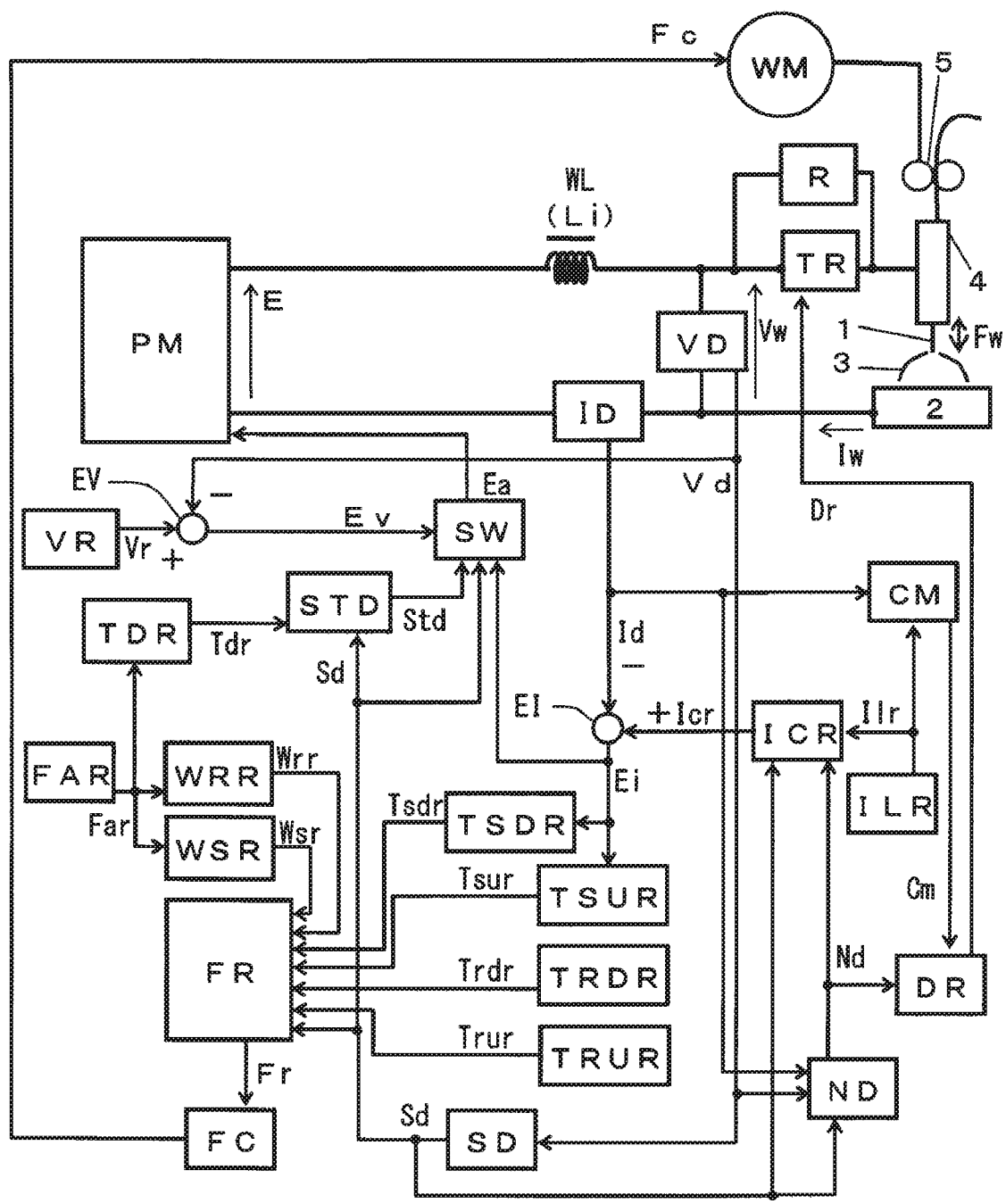
FIG. 1 is a block diagram of a welding power supply for implementing an arc welding control method according to a first embodiment of the disclosure.

FIG. 1 is a block diagram of a welding power supply for performing an arc welding control method according to a first embodiment of the disclosure. Each block will be described below with reference to FIG. 1.

Using a commercial power supply (not shown) such as three-phase 200V as an input, a power supply main circuit PM performs an output control by an inverter control or the like according to an error amplification signal Ea (to be described later) and outputs an output voltage E. Although not shown, the power supply main circuit PM includes a primary rectifier for rectifying the commercial power supply, a smoothing capacitor for smoothing the rectified direct current, an inverter circuit driven by the error amplification signal Ea and converting the smoothed direct current into high-frequency alternating current, a high-frequency transformer for stepping down the high-frequency alternating current to a voltage value suitable for welding, and a secondary rectifier for rectifying the stepped-down high-frequency alternating current into direct current.

The output voltage E is smoothed by a reactor WL. An inductance value of the reactor WL is, for example, 200 μH.

Using a feeding control signal Fc (to be described later) as an input, a feed motor WM feeds a welding wire 1 at a feeding rate Fw while alternately repeating a forward feeding and a reverse feeding. A motor with fast transient response is used as the feed motor WM. In some cases, the feed motor WM is installed near a tip of a welding torch 4 in order to increase a changing rate of the feeding rate Fw and an inversion speed of a feeding direction of the welding wire 1. Further, in some cases, two feed motors WM are used to form a push-pull type feeding system.

The welding wire 1 is fed inside the welding torch 4 by the rotation of a feed roll 5 coupled to the feed motor WM, and thus, an arc 3 is generated between the welding wire 1 and a base metal 2. A welding voltage Vw is applied between a power supply tip (not shown) inside the welding torch 4 and the base metal 2, and thus, a welding current Iw is supplied.

A current detection circuit ID detects the welding current Iw and outputs a current detection signal Id. A voltage detection circuit VD detects the welding voltage Vw and outputs a voltage detection signal Vd. Using the voltage detection signal Vd as an input, a short-circuit discrimination circuit SD outputs a short-circuit discrimination signal Sd. The short-circuit discrimination signal Sd becomes High level by discriminating that it is in a short-circuit period when the value of the voltage detection signal Vd is less than a predetermined short-circuit discrimination value (about 10V). The short-circuit discrimination signal Sd becomes Low level by discriminating that it is in an arc period when the value of the voltage detection signal Vd is equal to or greater than the short-circuit discrimination value.

A voltage setting circuit VR outputs a predetermined voltage setting signal Vr.

Using the voltage setting signal Vr and the voltage detection signal Vd as an input, a voltage error amplification circuit EV amplifies an error between the voltage setting signal Vr (+) and the voltage detection signal Vd (−) and outputs a voltage error amplification signal Ev.

An average feeding rate setting circuit FAR outputs a predetermined average feeding rate setting signal Far.

A forward-feeding acceleration period setting circuit TSUR outputs a predetermined forward-feeding acceleration period setting signal Tsur.

A forward-feeding deceleration period setting circuit TSDR outputs a predetermined forward-feeding deceleration period setting signal Tsdr.

A reverse-feeding acceleration period setting circuit TRUR outputs a predetermined reverse-feeding acceleration period setting signal Trur.

A reverse-feeding deceleration period setting circuit TRDR outputs a predetermined reverse-feeding deceleration period setting signal Trdr.

Using the average feeding rate setting signal Far as an input, a forward-feeding peak value setting circuit WSR outputs a predetermined forward-feeding peak value setting signal Wsr corresponding to the average feeding rate setting signal Far. The forward-feeding peak value setting signal Wsr is calculated in advance by experiment so that the average value of the feeding rate Fw and the value of the average feeding rate setting signal Far are equal. Further, the value of the forward-feeding peak value setting signal Wsr corresponding to the average feeding rate setting signal Far is stored.

Using the average feeding rate setting signal Far as an input, a reverse-feeding peak value setting circuit WRR outputs a predetermined reverse-feeding peak value setting signal Wrr corresponding to the average feeding rate setting signal Far. The reverse-feeding peak value setting signal Wrr is calculated in advance by experiment so that the average value of the feeding rate Fw and the value of the average feeding rate setting signal Far are equal. Further, the value of the reverse-feeding peak value setting signal Wrr corresponding to the average feeding rate setting signal Far is stored.

Using the forward-feeding acceleration period setting signal Tsur, the forward-feeding deceleration period setting signal Tsdr, the reverse-feeding acceleration period setting signal Trur, the reverse-feeding deceleration period setting signal Trdr, the forward-feeding peak value setting signal Wsr, the reverse-feeding peak value setting signal Wrr and the short-circuit discrimination signal Sd as an input, a feeding rate setting circuit FR outputs a feeding rate pattern generated by the following process as a feeding rate setting signal Fr. The period where the feeding rate setting signal Fr is equal to or greater than zero is defined as a forward-feeding period, and the period where the feeding rate setting signal Fr is less than zero is defined as a reverse-feeding period.

1) During a forward-feeding acceleration period Tsu determined by the forward-feeding acceleration period setting signal Tsur, the feeding rate setting signal Fr linearly accelerating from zero to a forward-feeding peak value Wsp of a positive value determined by the forward-feeding peak value setting signal Wsr is outputted.

2) Subsequently, during a forward-feeding peak period Tsp, the feeding rate setting signal Fr for maintaining the forward-feeding peak value Wsp is outputted.

3) When the short-circuit discrimination signal Sd changes from Low level (arc period) to High level (short-circuit period), the feeding rate is shifted to a forward-feeding deceleration period Tsd determined by the forward-feeding deceleration period setting signal Tsdr, and the feeding rate setting signal Fr linearly decelerating from the forward-feeding peak value Wsp to zero is outputted.

4) Subsequently, during a reverse-feeding acceleration period Tru determined by the reverse-feeding acceleration period setting signal Trur, the feeding rate setting signal Fr linearly accelerating from zero to a reverse-feeding peak value Wrp of a negative value determined by the reverse-feeding peak value setting signal Wrr is outputted.

5) Subsequently, during a reverse-feeding peak period Trp, the feeding rate setting signal Fr for maintaining the reverse-feeding peak value Wrp is outputted.

6) When the short-circuit discrimination signal Sd changes from High level (short-circuit period) to Low level (arc period), the feeding rate is shifted to a reverse-feeding deceleration period Trd determined by the reverse-feeding deceleration period setting signal Trdr, and the feeding rate setting signal Fr linearly decelerating from the reverse-feeding peak value Wrp to zero is outputted.

7) By repeating the above steps 1) to 6), the feeding rate setting signal Fr of a feed pattern changing into positive and negative trapezoidal wave shapes is generated.

Using the feeding rate setting signal Fr as an input, a feeding control circuit FC outputs the feeding control signal Fc for feeding the welding wire 1 at the feeding rate Fw corresponding to the value of the feeding rate setting signal Fr to the feed motor WM.

A current decreasing resistor R is inserted between the reactor WL and the welding torch 4. The value of the current decreasing resistor R is set to a value (about 0.5 to 3Ω) that is ten or more times larger than the short circuit load (about 0.01 to 0.03Ω). When the current decreasing resistor R is inserted into a power feeding path, the energy stored in the reactor WL and a reactor of an external cable is drastically discharged.

A transistor TR is connected in parallel with the current decreasing resistor R and is controlled to be turned on or off according to a drive signal Dr (to be described later).

Using the short-circuit discrimination signal Sd, the voltage detection signal Vd and the current detection signal Id as an input, a constriction detection circuit ND outputs a constriction detection signal Nd. The constriction detection signal Nd becomes High level by discriminating that the formation state of the constriction becomes a reference state at the time when the voltage rising value of the voltage detection signal Vd when the short-circuit discrimination signal Sd is at High level (short-circuit period) reaches a reference value. The constriction detection signal Nd becomes Low level at the time when the short-circuit discrimination signal Sd changes to Low level (arc period). Further, the constriction detection signal Nd may be changed to High level at the time when the differential value of the voltage detection signal Vd during the short-circuit period reaches a reference value corresponding thereto. Furthermore, the constriction detection signal Nd may be changed to High level at the time when a resistance value of a droplet is calculated by dividing the value of the voltage detection signal Vd by the value of the current detection signal Id and the differential value of the resistance value reaches a reference value corresponding thereto.

A low-level current setting circuit ILR outputs a predetermined low-level current setting signal Ilr. Using the low-level current setting signal Ilr and the current detection signal Id as an input, a current comparison circuit CM outputs a current comparison signal Cm which becomes High level when Id<Ilr and becomes Low level when Id≥Ilr.

Using the current comparison signal Cm and the constriction detection signal Nd as an input, a drive circuit DR outputs the drive signal Dr to a base terminal of the transistor TR. The drive signal Dr changes to Low level when the constriction detection signal Nd changes to High level, and thereafter, the drive signal Dr changes to High level when the current comparison signal Cm changes to High level. Therefore, the drive signal Dr becomes Low level when the constriction is detected, the transistor TR is turned off, and the current decreasing resistor R is inserted into the power feeding path. In this way, the welding current Iw for energizing the short-circuit load is drastically reduced. Further, when the value of the drastically reduced welding current Iw decreases to the value of the low-level current setting signal Ilr, the drive signal Dr becomes High level and the transistor TR is turned on. In this way, the current decreasing resistor R is short-circuited and returns to its normal state.

Using the short-circuit discrimination signal Sd, the low-level current setting signal Ilr and the constriction detection signal Nd as an input, a current control setting circuit ICR performs the following process and outputs a current control setting signal Icr.

1) When the short-circuit discrimination signal Sd is at Low level (arc period), the current control setting signal Icr which is the low-level current setting signal Ilr is outputted.

2) When the short-circuit discrimination signal Sd changes to High level (short-circuit period), the current control setting signal Icr is outputted. The current control setting signal Icr has a predetermined initial current setting value during a predetermined initial period. Thereafter, the current control setting signal Icr rises to a predetermined short-circuit peak setting value at a predetermined short-circuit slope and maintains its value.

3) Then, when the constriction detection signal Nd changes to High level, the current control setting signal Icr which is the value of the low-level current setting signal Ilr is outputted.

Using the current control setting signal Icr and the current detection signal Id as an input, a current error amplification circuit EI amplifies an error between the current control setting signal Icr (+) and the current detection signal Id (−) and outputs a current error amplification signal Ei.

A current drop time setting circuit TDR calculates a current drop time Td by a predetermined current drop time calculation function using the average feeding rate setting signal Far as an input and outputs a current drop time setting signal Tdr. The current drop time calculation function is, for example, Td(ms)=0.5×Far(m/min)+4. In the case where Far is set in the range of 0 to 10 m/min, Td varies in the range of 4 to 9 ms. The current drop time calculation function is set to an appropriate value by experiment according to the diameter and material of the welding wire.

Using the short-circuit discrimination signal Sd and the current drop time setting signal Tdr as an input, a small-current period circuit STD outputs a small-current period signal Std. The small-current period signal Std becomes High level when a current drop time td determined by the current drop time setting signal Tdr has elapsed from the time when the short-circuit discrimination signal Sd changes to Low level (arc period). Thereafter, the small-current period signal Std becomes Low level when the short-circuit discrimination signal Sd becomes High level (short-circuit period).

Using the current error amplification signal Ei, the voltage error amplification signal Ev, the short-circuit discrimination signal Sd and the small-current period signal Std as an input, a power supply characteristic switching circuit SW performs the following process and outputs the error amplification signal Ea.

1) During the period from the time when the short-circuit discrimination signal Sd changes to High level (short-circuit period) until the time when the short-circuit discrimination signal Sd changes to Low level (arc period) and a predetermined delay time has elapsed, the current error amplification signal Ei is outputted as the error amplification signal Ea.

2) During the subsequent arc period, the voltage error amplification signal Ev is outputted as the error amplification signal Ea.

3) During the subsequent arc period during which the small-current period signal Std is at High level, the current error amplification signal Ei is outputted as the error amplification signal Ea.

With this circuit, the welding power supply has constant-current characteristics during the short-circuit period, the delay time and the small-current period, and has constant-voltage characteristics during the other arc period.

Figure 2:
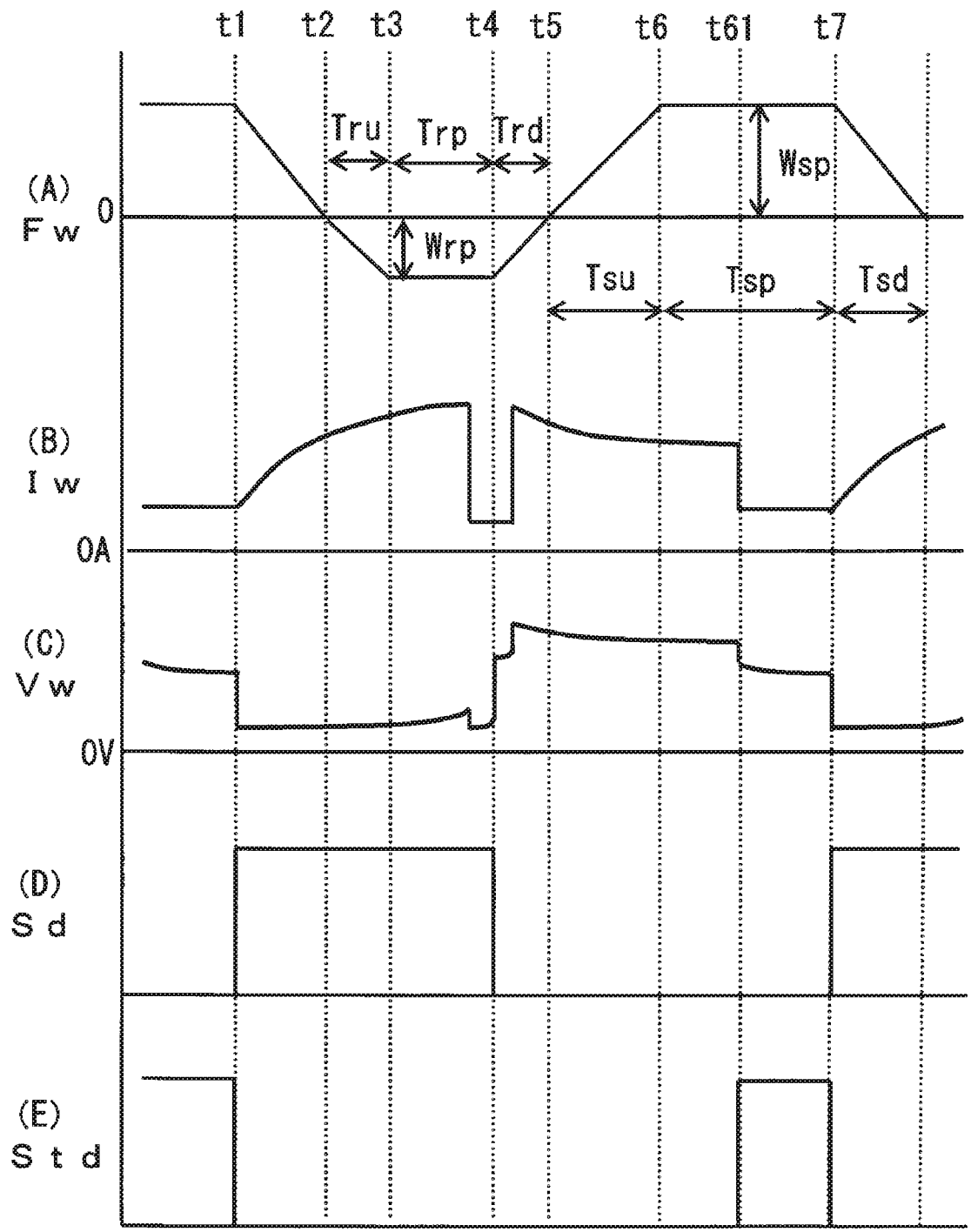
FIG. 2 is a timing chart of each signal in the welding power supply of FIG. 1, showing the arc welding control method according to the first embodiment of the disclosure.

FIG. 2 is a timing chart of each signal in the welding power supply of FIG. 1, showing the arc welding control method according to the first embodiment of the disclosure. FIG. 2A shows the variation of the feeding rate Fw over time, FIG. 2B shows the variation of the welding current Iw over time, FIG. 2C shows the variation of the welding voltage Vw over time, FIG. 2D shows the variation of the short-circuit discrimination signal Sd over time, and FIG. 2E shows the variation of the small-current period signal Std over time. Hereinafter, the operation of each signal will be described with reference to FIG. 2.

The feeding rate Fw shown in FIG. 2A is controlled to the value of the feeding rate setting signal Fr outputted from the feeding rate setting circuit FR of FIG. 1. The feeding rate Fw is formed from the forward-feeding acceleration period Tsu determined by the forward-feeding acceleration period setting signal Tsur of FIG. 1, the forward-feeding peak period Tsp that continues until a short circuit occurs, the forward-feeding deceleration period Tsd determined by the forward-feeding deceleration period setting signal Tsdr of FIG. 1, the reverse-feeding acceleration period Tru determined by the reverse-feeding acceleration period setting signal Trur of FIG. 1, the reverse-feeding peak period Trp that continues until an arc occurs, and the reverse-feeding deceleration period Trd determined by the reverse-feeding deceleration period setting signal Trdr of FIG. 1. Further, the forward-feeding peak value Wsp is determined as a value corresponding to the average feeding rate setting signal Far by the forward-feeding peak value setting signal Wsr of FIG. 1, and the reverse-feeding peak value Wrp is determined as a value corresponding to the average feeding rate setting signal Far by the reverse-feeding peak value setting signal Wrr of FIG. 1. As a result, the feeding rate setting signal Fr becomes a feed pattern changing into substantially positive and negative trapezoidal wave shapes.

Operation in Short-circuit Period from Time t1 to Time t4

When a short circuit occurs at time t1 during the forward-feeding peak period Tsp, the welding voltage Vw is drastically reduced to a short-circuit voltage value of several Volts, as shown in FIG. 2C. Therefore, as shown in FIG. 2D, the short-circuit discrimination signal Sd changes to High level (short-circuit period). In response to this, the feeding rate is shifted to the predetermined forward-feeding deceleration period Tsd from time t1 to time t2. As shown in FIG. 2A, the feeding rate Fw is decelerated from the forward-feeding peak value Wsp to zero. For example, the forward-feeding deceleration period Tsd is set to 1 ms.

As shown in FIG. 2A, the feeding rate Fw enters the predetermined reverse-feeding acceleration period Tru from time t2 to time t3 and is accelerated from zero to the reverse-feeding peak value Wrp. During this period, the short-circuit period continues. For example, the reverse-feeding acceleration period Tru is set to 1 ms.

When the reverse-feeding acceleration period Tru ends at time t3, as shown in FIG. 2A, the feeding rate Fw enters the reverse-feeding peak period Trp and becomes the reverse-feeding peak value Wrp. The reverse-feeding peak period Trp continues until an arc occurs at time t4. Therefore, the period from time t1 to time t4 is the short-circuit period. The reverse-feeding peak period Trp is not a predetermined value, but is about 2 ms. Further, the reverse-feeding peak value Wrp is changed according to the average feeding rate setting signal Far, but is set to about −30 to −50 m/min.

As shown in FIG. 2B, the welding current Iw during the short-circuit period from time t1 to time t4 is a predetermined initial current value during a predetermined initial period. Thereafter, the welding current Iw rises at a predetermined short-circuit slope and maintains its value when reaching a predetermined short-circuit peak value.

As shown in FIG. 2C, the welding voltage Vw rises from the point where the welding current Iw has a short-circuit peak value. The reason is that a constriction is gradually formed in the droplet at the tip of the welding wire 1 by the reverse feeding of the welding wire 1 and the action of the pinching force by the welding current Iw.

Thereafter, when the voltage rising value of the welding voltage Vw reaches the reference value, it is discriminated that the formation state of the constriction reaches the reference state, and the constriction detection signal Nd of FIG. 1 changes to High level.

In response to the constriction detection signal Nd becoming High level, the drive signal Dr of FIG. 1 becomes Low level. Therefore, the transistor TR of FIG. 1 is turned off and the current decreasing resistor R of FIG. 1 is inserted into the power supply path. Simultaneously, the current control setting signal Icr of FIG. 1 is reduced to the value of the low-level current setting signal Ilr. Therefore, as shown in FIG. 2B, the welding current Iw is drastically reduced from the short-circuit peak value to the low-level current value. Further, when the welding current Iw is reduced to the low-level current value, the drive signal Dr returns to High level. Therefore, the transistor TR is turned on and the current decreasing resistor R is short-circuited. As shown in FIG. 2B, since the current control setting signal Icr is kept as the low-level current setting signal Ilr, the welding current Iw maintains the low-level current value until a predetermined delay period has elapsed from the reoccurrence of the arc. Therefore, the transistor TR is turned off only during the period from the time when the constriction detection signal Nd changes to High level to the time when the welding current Iw is reduced to the low-level current value. As shown in FIG. 2C, since the welding current Iw decreases, the welding voltage Vw temporarily decreases and then rises drastically. Each of the above-mentioned parameters is set to, for example, the following value. Initial current=40 A, initial period=0.5 ms, short-circuit slope=2 ms, short-circuit peak value=400 A, low-level current value=50 A, delay period=1 ms.

Operation in Arc Period from Time t4 to Time t7

When a constriction progresses by the reverse feeding of the welding wire and the pinching force due to the energization of the welding current Iw and an arc is generated at time t4, the welding voltage Vw drastically increases to an arc voltage value of several tens of Volts, as shown in FIG.

2C. Therefore, as shown in FIG. 2D, the short-circuit discrimination signal Sd changes to Low level (arc period). In response to this, the feeding rate Fw is shifted to the predetermined reverse-feeding deceleration period Trd from time t4 to time t5 and the feeding rate Fw is decelerated from the reverse-feeding peak value Wrp to zero, as shown in FIG. 2A. For example, the reverse-feeding deceleration period Trd is set to 1 ms.

When the reverse-feeding deceleration period Trd ends at time t5, the feeding rate Fw is shifted to the predetermined forward-feeding acceleration period Tsu from time t5 to time t6. During the forward-feeding acceleration period Tsu, the feeding rate Fw is accelerated from zero to the forward-feeding peak value Wsp, as shown in FIG. 2A. During this period, the arc period continues. For example, the forward-feeding acceleration period Tsu is set to 1 ms.

When the forward-feeding acceleration period Tsu ends at time t6, the feeding rate Fw enters the forward-feeding peak period Tsp and has the forward-feeding peak value Wsp, as shown in FIG. 2A. The arc period continues during this period. The forward-feeding peak period Tsp continues until a short circuit occurs at time t7. Therefore, the period from time t4 to time t7 is defined as the arc period. Further, when a short circuit occurs, the operation returns to the operation at time t1. The forward-feeding peak period Tsp is not a predetermined value, but is about 4 ms. Further, the forward-feeding peak value Wsp is changed according to the average feeding rate setting signal Far, but is set to about 30 to 50 m/min.

When an arc occurs at time t4, the welding voltage Vw drastically increases to an arc voltage value of several tens of Volts, as shown in FIG. 2C. On the other hand, as shown in FIG. 2B, the welding current Iw continues to maintain the low-level current value during the delay period from time t4. Thereafter, the welding current Iw increases and has a high-current value. During the arc period at which the welding current Iw has the high-current value, the feed-back control of the welding power supply is performed by the voltage error amplification signal Ev of FIG. 1, and the welding power supply has constant-voltage characteristics.

At time t61 when the current drop time Td determined by the current drop time setting signal Tdr of FIG. 1 has elapsed from the occurrence of the arc at time t4, the small-current period signal Std changes to High level, as shown in FIG. 2E. In response to this, the welding power supply is switched from the constant-voltage characteristics to the constant-current characteristics. Therefore, as shown in FIG. 2B, the welding current Iw decreases to the low-level current value and maintains its value until time t7 at which a short circuit occurs. Similarly, as shown in FIG. 2C, the welding voltage Vw also decreases. When a short circuit occurs at time t7, the small-current period signal Std returns to Low level.

The current drop time Td is a value corresponding to the average feeding rate setting signal Far. Preferably, the current drop time Td is set so that the timing (time t61 at which the small-current period signal Std becomes High level) at which the welding current Iw becomes a small current value is a timing about 0.5 to 1 ms earlier than time t7 at which a short circuit occurs. As a result, the timing at time t61 is placed within the forward-feeding peak period Ts. When the current drop time Td is too short, the period from time t61 to t7 of the small current value becomes longer and the arc state becomes unstable. Conversely, when the current drop time Td is too long, the welding current Iw does not become a small current value even when a short circuit occurs, and thus, spatters increase. That is, it is important that the current drop time Td is set to an appropriate value according to the welding conditions. Among the welding conditions, the average feeding rate has the greatest influence on the time length of the arc period. Therefore, in the present embodiment, the current drop time Td is optimized according to the average feeding rate.

According to the above-described first embodiment, the timing of switching the welding current to a small current value is changed on the basis of the average feeding rate setting value. The average value of the feeding rate is set by the average feeding rate setting value, and the average value of the welding current is set by the average value of the feeding rate. As the average value of the feeding rate changes, the arc state changes and the time length of the arc period changes. Therefore, when the timing (current drop time) of switching the welding current to a small current value is changed and optimized according to the average feeding rate setting value, the welding current is switched to a small current value immediately before a short circuit occurs. In this way, the arc state can be stably maintained and the spatter generation amount can be reduced.

In the above description, the start point of the current drop time Td is set as the arc reoccurrence time. However, the start point of the current drop time Td may be set as time t5 at which the feeding rate Fw is switched to the forward feeding. Further, the start point of the current drop time Td may be the time at which an arc reoccurs and the delay period ends.

Second Embodiment

In the invention of the second embodiment, the timing of switching the welding current to a small current value is changed on the basis of the voltage setting value, in addition to the average feeding rate setting value. Specifically, in the invention of the second embodiment, a reference voltage setting value is set according to the average feeding rate setting value, and the timing of switching the welding current to a small current value is changed on the basis of an error amplification value between the voltage setting value and the reference voltage setting value.

Figure 3:
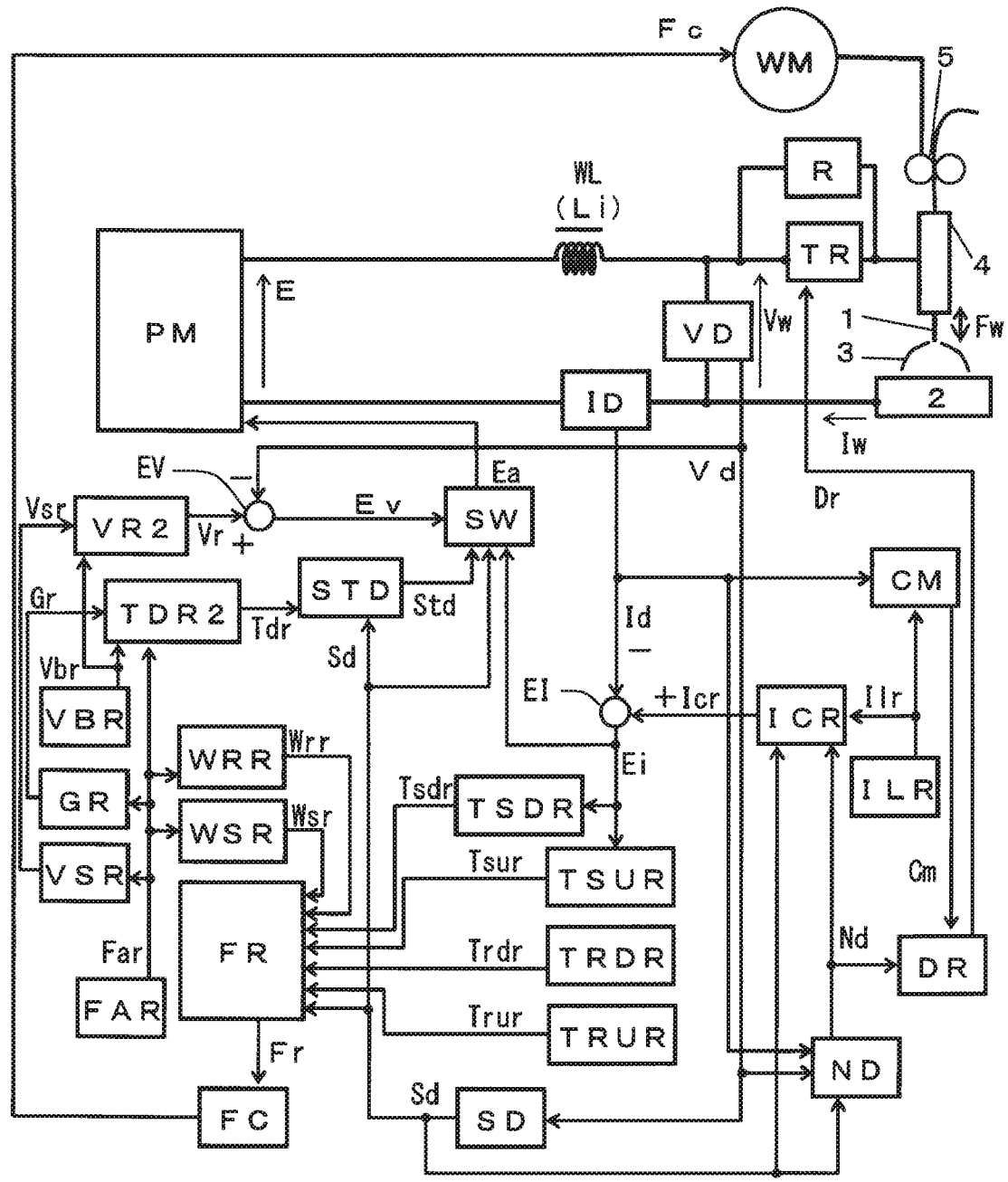
FIG. 3 is a block diagram of a welding power supply for implementing an arc welding control method according to a second embodiment of the disclosure.

FIG. 3 is a block diagram of a welding power supply for implementing an arc welding control method according to the second embodiment of the disclosure. FIG. 3 corresponds to FIG. 1 described above, and the same blocks are denoted by the same reference numerals and description thereof will not be repeated. In FIG. 3, a reference voltage setting circuit VSR, a voltage fine-tuning circuit VBR and an amplification factor setting circuit GR are added to FIG. 1, the voltage setting circuit YR of FIG. 1 is replaced by a second voltage setting circuit VR2, and the current drop time setting circuit TDR of FIG. 1 is replaced by a second current drop time setting circuit TDR2. Hereinafter, these blocks will be described with reference to FIG. 3.

The reference voltage setting circuit VSR calculates a reference voltage value by a predetermined one-way adjustment function using the average feeding rate setting signal Far as an input and outputs a reference voltage setting signal Vsr. This circuit relates to one-way adjustment control which is a conventional technique, and sets a reference voltage value which is a recommended value of the welding voltage according to the average feeding rate.

The voltage fine-tuning circuit VBR outputs a predetermined voltage fine-tuning signal Vbr. The voltage fine-tuning signal Vbr is set in the range of −5V to +5V, for example.

The amplification factor setting circuit GR calculates an amplification factor by a predetermined amplification factor calculation function using the average feeding rate setting signal Far as an input and outputs an amplification factor setting signal Gr. For example, the amplification factor calculation function is a function in which Gr=0.5 when Far<4 and Gr=1.0 when Far≥4. This function may be a function corresponding to a straight line or a curve.

Using the reference voltage setting signal Vsr and the voltage fine-tuning signal Vbr as an input, the second voltage setting circuit VR2 adds both values (Vsr+Vbr) and outputs the voltage setting signal Vr.

Using the average feeding rate setting signal Far, the voltage fine-tuning signal Vbr and the amplification factor setting signal Gr as an input, the second current drop time setting circuit TDR2 performs the following process and outputs the current drop time setting signal Tdr.

1) The average feeding rate setting signal Far is inputted to the predetermined current drop time calculation function to calculate the reference current drop time.

2) The current drop time Td=the reference current drop time+Gr·Vbr is calculated and the current drop time setting signal Tdr is outputted. This "Gr·Vbr" constitutes an error amplification value.

The following operations are performed by the second current drop time setting circuit TDR2.

Step 1) Similar to the first embodiment, the reference current drop time corresponding to the average feeding rate setting value is calculated.

Step 2) The reference voltage setting value corresponding to the average feeding rate setting value is calculated.

Step 3) The error amplification value between the voltage setting value and the reference voltage setting value is calculated. The amplification factor is a function of the average feeding rate setting value.

Step 4) The reference current drop time is corrected by the error amplification value to calculate the current drop time Td.

Numerical examples of the above steps 1) to 4) are illustrated.

Step 1) When Far=3 m/min, the reference current drop time (=0.5×3+4=5.5 ms) is calculated.

Step 2) The reference voltage setting value (=18V) is calculated when Far=3.

Step 3) The error amplification value (=0.5×(19−18)=0.5) between the voltage setting value (=19V) and the reference voltage setting value (=18V) is calculated. Since Far=3, the amplification factor is 0.5.

Step 4) The reference current drop time (=5.5 ms) is corrected by the error amplification value (=0.5), and the current drop time Td (=5.5+0.5=6.0 ms) is calculated.

Step 1) When Far=6 m/min, the reference current drop time (=0.5×6+4=7.0 ms) is calculated.

Step 2) The reference voltage setting value (=26V) is calculated when Far=6.

Step 3) The error amplification value (=1.0×(25−26)=−1.0) between the voltage setting value (=25V) and the reference voltage setting value (=26V) is calculated. Since Far=6, the amplification factor is 1.0.

Step 4) The reference current drop time (=7.0 ms) is corrected by the error amplification value (=−1.0), and the current drop time Td (=7.0−1.0=6.0 ms) is calculated.

The operation of each signal in FIG. 3 is the same as that in FIG. 2 described above. However, the method of setting the current drop time Td is different from that in the first embodiment as described above.

According to the above-described second embodiment, the timing (current drop time) of switching the welding current to a small current value is changed on the basis of the voltage setting value, in addition to the average feeding rate setting value. Specifically, in the second embodiment, the reference voltage setting value is set according to the average feeding rate setting value, and the timing of switching the welding current to a small current value is changed on the basis of the error amplification value between the voltage setting value and the reference voltage setting value. In addition to the average feeding rate, when the voltage setting value is different, the arc state changes and the time length of the arc period changes. Therefore, in the second embodiment, the current drop time set according to the average feeding rate is corrected according to the voltage setting value. In this way, in the second embodiment, the current drop time can be optimized according to the average feeding rate and the voltage setting value, so that the arc state can be further stabilized and the spatter generation amount can be further reduced.

Further, in the second embodiment, the amplification factor at the time of calculating the error amplification value may be changed according to the average feeding rate setting value. In this way, the correction amount at the time of correcting the current drop time according to the voltage setting value can be optimized according to the average feeding rate. The change amount in the time length of the arc period relative to the change amount in the voltage setting value varies depending on the average feeding rate. Therefore, when the amplification factor is optimized according to the average feeding rate, the correction amount can be optimized. As a result, it is possible to further stabilize the arc state and reduce the spatter generation amount when the voltage setting value is changed.

INDUSTRIAL APPLICABILITY

According to the disclosure, the smoothing value of the welding current can be kept constant even when a distance between a power-feeding tip and a base metal is varied in the welding in which the forward-feeding period and the reverse-feeding period of the feeding rate are alternately switched. In this way, the penetration depth can be equalized.

Although the disclosure has been described with reference to the specific embodiments, the disclosure is not limited to these embodiments and various modifications can be made without departing from the technical concept of the disclosed invention. The present application is based on Japanese Patent Application (Patent Application No. 2016-152028) filed on Aug. 2, 2016, the contents of which are incorporated herein by reference.

REFERENCE NUMERALS LIST

1 Welding Wire
2 Base Metal
3 Arc
4 Welding Torch
5 Feed Roll
CM Current Comparison Circuit
Cm Current Comparison Signal
DR Drive Circuit
Dr Drive Signal
E Output Voltage
Ea Error Amplification Signal
EI Current Error Amplification Circuit
Ei Current Error Amplification Signal
EV Voltage Error Amplification Circuit
Ev Voltage Error Amplification Signal FAR Average Feeding Rate Setting Circuit
Far Average Feeding Rate Setting Signal
FC Feeding Control Circuit
Fc Feeding Control Signal
FR Feeding Rate Setting Circuit
Fr Feeding Rate Setting Signal
Fw Feeding Rate
GR Amplification Factor Setting Circuit
Gr Amplification Factor Setting Signal
ICR Current Control Setting Circuit
Icr Current Control Setting Signal
ID Current Detection Circuit
Id Current Detection Signal
ILR Low-level Current Setting Circuit
Ilr Low-level Current Setting Signal
Iw Welding Current
ND Constriction Detection Circuit
Nd Constriction Detection Signal
PM Power Supply Main Circuit
R Current Decreasing Resistor
SD Short-circuit Discrimination Circuit
Sd Short-circuit Discrimination Signal
STD Small-current Period Circuit
Std Small-current Period Signal
SW Power Supply Characteristic Switching Circuit
td Current Drop Time
TDR Current Drop Time Setting Circuit
Tdr Current Drop Time Setting Signal
TDR2 Second Current Drop Time Setting Circuit
TR Transistor
Trd Reverse-feeding Deceleration Period
TRDR Reverse-feeding Deceleration Period Setting Circuit
Trdr Reverse-feeding Deceleration Period Setting Signal
Trp Reverse-feeding Peak Period
Tru Reverse-feeding Acceleration Period
TRUR Reverse-feeding Acceleration Period Setting Circuit
Trur Reverse-feeding Acceleration Period Setting Signal
Tsd Forward-feeding Deceleration Period
TSDR Forward-feeding Deceleration Period Setting Circuit
Tsdr Forward-feeding Deceleration Period Setting Signal
Tsp Forward-feeding Peak Period
Tsu Forward-feeding Acceleration Period
TSUR Forward-feeding Acceleration Period Setting Circuit
Tsur Forward-feeding Acceleration Period Setting Signal
VBR Voltage Fine-Tuning Circuit
Vbr Voltage Fine-Tuning Signal
VD Voltage Detection Circuit
Vd Voltage Detection Signal
VR Voltage Selling Circuit
Vr Voltage Setting Signal
VR2 Second Voltage Setting Circuit
VSR Reference Voltage Setting Circuit
Vsr Reference Voltage Setting Signal
Vw Welding Voltage
WL Reactor
WM Feed Motor
Wrp Reverse-feeding Peak Value
WRR Reverse-feeding Peak Value Setting Circuit
Wrr Reverse-feeding Peak Value Setting Signal
Wsp Forward-feeding Peak Value
WSR Forward-feeding Peak Value Setting Circuit
Wsr Forward-feeding Peak Value Setting Signal

What is claimed is:

1. An arc welding control method comprising:
alternately switching a feeding rate of a welding wire between a forward-feeding period and a reverse-feeding period,
repeating a short-circuit period and an arc period,
switching a welding current to a small current value in the latter half of the arc period to energize,
setting an average value of the feeding rate according to an average feeding rate setting value,
setting a welding voltage during the arc period according to a voltage setting value,
changing a timing, in the latter half of the arc period, wherein the timing is an elapsed time from a start of the arc period, at which the welding current is switched to the small current value based on the average feeding rate setting value and the voltage setting value,
making the voltage setting value to be set to a reference voltage setting value determined according to the average feeding rate setting value, and
in a case where the voltage setting value set to the reference voltage setting value is changed by a user, changing the timing at which the welding current is switched to the small current value, from the timing in a case where the voltage setting value is the reference voltage setting value, based on an error amplification value between the voltage setting value changed by the user and the reference voltage setting value.

2. The arc welding control method according to claim 1, comprising
changing an amplification factor at the time of calculating the error amplification value according to the average feeding rate setting value.

* * * * *